US011368745B2

(12) United States Patent
Fersch et al.

(10) Patent No.: US 11,368,745 B2
(45) Date of Patent: Jun. 21, 2022

(54) PROCESSING MEDIA DATA STRUCTURES

(71) Applicant: DOLBY INTERNATIONAL AB, Amsterdam Zuidoost (NL)

(72) Inventors: Christof Fersch, Neumarkt (DE); Wolfgang A. Schildbach, Nuremberg (DE)

(73) Assignee: Dolby International AB, Amsterdam (NL)

( * ) Notice: Subject to any disclaimer, the term of this patent is extended or adjusted under 35 U.S.C. 154(b) by 0 days.

(21) Appl. No.: 17/257,847

(22) PCT Filed: Jul. 3, 2019

(86) PCT No.: PCT/EP2019/067870
§ 371 (c)(1),
(2) Date: Jan. 4, 2021

(87) PCT Pub. No.: WO2020/007922
PCT Pub. Date: Jan. 9, 2020

(65) Prior Publication Data
US 2021/0297729 A1    Sep. 23, 2021

Related U.S. Application Data

(60) Provisional application No. 62/694,107, filed on Jul. 5, 2018.

(30) Foreign Application Priority Data

Jul. 5, 2018  (EP) ..................................... 18181820

(51) Int. Cl.
*H04N 21/434* (2011.01)
*H04N 21/439* (2011.01)
(Continued)

(52) U.S. Cl.
CPC ..... *H04N 21/4349* (2013.01); *H04N 21/4398* (2013.01); *H04N 21/440218* (2013.01); *H04N 21/8193* (2013.01)

(58) Field of Classification Search
CPC .......... H04N 21/4349; H04N 21/4398; H04N 21/440218; H04N 21/8193
See application file for complete search history.

(56) References Cited

U.S. PATENT DOCUMENTS 6,480,537 B1   11/2002 Agrawal
9,032,462 B2 *  5/2015 Hong ................... H04N 21/816
                                                       725/109
(Continued)

FOREIGN PATENT DOCUMENTS

CN  101543011 B   5/2013
CN  102075528 B  12/2014
(Continued)

OTHER PUBLICATIONS

ISO/IEC 14496-12:2015 Information Technology—Coding of Audio-Visual Objects—Part 12: ISO Base Media File Format.
(Continued)

*Primary Examiner* — James R Sheleheda

(57) ABSTRACT

A method of playing out media from a media engine run on a receiving apparatus, the method comprising: at the receiving apparatus, receiving a media data structure comprising audio or video content formatted in a plurality of layers, including at least a first layer comprising the audio or video content encoded according to an audio or video encoding scheme respectively, and a second layer encapsulating the encoded content in one or more media containers according to a media container format; determining that at least one of the media containers further encapsulates runnable code for processing at least some of the formatting of the media data structure in order to support playout of the audio or video
(Continued)

content by the media engine; running the code on a code engine of the receiving apparatus in order to perform the processing of the media data structure for input to the media engine.

12 Claims, 11 Drawing Sheets

(51) Int. Cl.
*H04N 21/4402* (2011.01)
*H04N 21/81* (2011.01)

(56) References Cited

U.S. PATENT DOCUMENTS

| | | | |
|---|---|---|---|
| 10,582,232 B1* | 3/2020 | Rundle | H04N 21/8456 |
| 2008/0250047 A1 | 10/2008 | Hannuksela | |
| 2010/0135646 A1 | 6/2010 | Bang | |
| 2013/0097334 A1 | 4/2013 | Wu | |
| 2014/0059180 A1 | 2/2014 | Giladi | |
| 2015/0296231 A1* | 10/2015 | Kwon | H04N 21/23614 725/116 |
| 2015/0326393 A1* | 11/2015 | Takashima | G11B 20/0021 380/30 |
| 2015/0382034 A1 | 12/2015 | Thangaraj | |
| 2016/0036885 A1* | 2/2016 | Takashima | H04L 67/2823 709/246 |
| 2016/0294795 A1 | 10/2016 | Drope | |
| 2017/0041364 A1 | 2/2017 | Trani | |
| 2017/0163363 A1* | 6/2017 | Yang | H04H 20/18 |
| 2018/0027264 A1 | 1/2018 | Cheung | |
| 2018/0131741 A1 | 5/2018 | Song | |
| 2018/0139475 A1* | 5/2018 | Hwang | H04N 21/235 |
| 2020/0294454 A1* | 9/2020 | Tsukagoshi | G09G 5/10 |
| 2021/0297729 A1* | 9/2021 | Fersch | H04N 21/4398 |

FOREIGN PATENT DOCUMENTS

| | | |
|---|---|---|
| CN | 106537925 A | 3/2017 |
| CN | 104394456 B | 12/2017 |
| WO | 2012047507 A1 | 4/2012 |
| WO | 2013023287 A1 | 2/2013 |
| WO | WO-2017189054 A1 * 11/2017 | ......... G06F 12/0862 |

OTHER PUBLICATIONS

ISO/IEC JTC1/SC 29 "Information technology—MPEG Systems Technologies—Part 15: Carriage of Web Resources in ISOBMFF" Feb. 2018.
ISO/IEC JTC1/SC29/WG11, WD on Carriage of Web Resource in ISOBMFF (ISO/IEC 23001-15) Oct. 2017, Macau, China.
Lu, L. et al "Adaptive Time Division Multiplexing Transmission Scheme for the Distributed Video Coding" 2016 International Conference on Optoelectronics and Image Processing.
RTMP "Research and Implementation of High Definition streaming Media Encapsulation and Live system Based on RTMP" Jun. 2015, pp. 1-57.

* cited by examiner

PROCESSING MEDIA DATA STRUCTURES

CROSS-REFERENCE TO RELATED APPLICATION

This application claims priority of the following priority applications: U.S. provisional application 62/694,107 (reference: D18049USP1), filed 5 Jul. 2018 and EP application 18181820.4 (reference: D18049EP), filed 5 Jul. 2018, which are hereby incorporated by reference.

TECHNICAL FIELD

The present disclosure relates to media container formats such as ISOBMFF for encapsulating encoded audio and/or video content.

BACKGROUND

"Media container" is a term of art in the field of transporting and storage of media data. It refers to a data structure for wrapping up content such as audio and/or video ("AV") content for transport over a transmission medium or storage on a data storage medium. For instance the transmission medium may comprise a network such as the Internet or a cellular network; or the storage medium may comprise a magnetic storage device such as a hard disk drive, an electronic medium such as a solid state drive or memory stick, or an optical medium such as a CD. A storage device such as a memory stick or removable drive can also be used as a means of transporting data from one device to another.

Audio and video media data is typically formatted in multiple layers for transmission or storage. These may be referred to as protocol layers or layers of formatting. At a first such layer the audio or video content is encoded according to an audio or video encoding scheme, the encoding comprising compression of the content. The encoding scheme may also be referred to as an encoding format. Typically the encoding scheme is a standardized scheme. For instance for audio the encoding scheme may comprise MP3, AC-4, MPEG-D USAC or an MPEG-H audio standard; or for video the encoding may comprise H.264, HEVC, etc. A device, software or specification for encoding and decoding audio or video media according to a given scheme is sometimes referred to as a codec (coder-decoder).

At a second, higher layer, the encoded media content is then encapsulated in a media container according to a media container format (also sometimes called a wrapper format). The media container format specifies metadata for inclusion in the container to wrap up the encapsulated content (the payload of the container). The metadata describes how one or more items of media and/or data are arranged within the container. For instance the container metadata may specify that audio track of encoding format I (e.g. AC-4) starts at byte X for Y bytes, and/or video track of encoding format II (e.g. HEVC) starts at byte V for W bytes, etc. In addition, the metadata typically lists more details on the coded format, such as (in audio) number of channels and sampling rate, or (in video) aspect ratio and number of frames per second, etc. An example of a media container format is ISOBMFF (ISO Base Media File Format), which is standardized by ISO/IEC 14496-12 and which also encompasses a number of extensions thereof. For the present purposes, a reference to ISOBMFF is taken to refer to ISO/IEC 14496-12 or any of the extensions derived therefrom, such as a MP4, 3GP, 3G2, Motion JPEG 2000, etc. Another example of a container format is the MPEG-2 Transport Stream (TS) format.

In the case of transport over a network, one form of transport is streaming. This means the bitstream is played out at the receiving device as-and-when it is received, i.e. so one received part of the stream is being played out while another, later part of the stream is still being downloaded to the receiving device (as opposed to waiting for all the content to download before playing out). For streaming the bitstream is broken down into smaller pieces, sometimes called segments or file chunks. Each such segment or chunk is encapsulated in a media container according to a media container format such as ISOBMFF or MPEG-2 TS (ISO/IEC 13818-1). At a third layer above the second layer (above the container format), there is provided streaming protocol to support the transport of the stream in pieces (e.g. segments or file chunks). The streaming protocol specifies a format for a media presentation description file, wherein this description file comprises pointers to the individual pieces of the stream (e.g. individual segments or file chunks). The description file of the streaming protocol is downloaded to the receiving device upon initiating the streaming, and then used to successively fetch the different chunks of the stream from the transmitting device (e.g. server) in a streamed fashion. The description file may also be downloaded again later during streaming to refresh it upon a certain event, such as a time running out. Examples of streaming protocols include MPEG-DASH (Dynamic Adaptive Streaming over HTTP) and HLS (HTTP Live Streaming).

As well as audio and video content, nowadays an item of media such as streamed TV show or tune can also comprise an embedded data track. This is conventionally used to provide additional content. For instance this could comprise timed-text such as subtitles, additional media such as actor profiles, and/or interactive content. Such data may be embedded in the container of a media container format such as ISOBMFF.

SUMMARY

An issue with media data structures is that there exist different possible variants of the formatting, e.g. different standards of container format or different audio or video encoding schemes. This means that a given media engine at the receive side, depending on its compatibility, may or may not be able to fully process the received data structure in order to play out the audio and/or video content contained therein. In some cases only partial play-out may be possible or in other case no play out may be possible at all. At present, to deal with this, content providers have to create differently formatted versions of the same content in order to anticipate the possibility of different capability of the receive side. This is wasteful in terms of storage or processing resources: either the provider has to pre-generate and store two or more different versions of a given item of content (e.g. a given show or tune), which is wasteful of storage space; or else the provider has to dynamically convert the formatting on the fly as-and-when the resource is requested by the receiver, which incurs a lot of processing resource at the transmit side.

As mentioned, media container files support the ability to include supplementary data as well as AV content. Conventionally this is used to provide additional content such as subtitles, etc. However, the data track could be used to embed other kinds of data, even runnable code such as a script for running in a browser at the receive side (e.g. JavaScript). It is recognized herein that this ability could be used to include code to be run at the receive side for adapting the formatting of the data structure. This can be used to enable a provider to provide a given version of a media data structure to a receiving apparatus that only supports a different formatting. E.g. this can be used to provide one version of a data structure for receipt by different receiving apparatuses with support for different formats.

According to one aspect disclosed herein, there is provided a method of playing out media from a media engine run on a receiving apparatus. The method comprises: at the receiving apparatus, receiving a media data structure comprising audio or video content formatted in a plurality of layers, including at least a first layer comprising the audio or video content encoded according to an audio or video encoding scheme respectively, and a second layer encapsulating the encoded content in one or more media containers according to a media container format. The method further comprises: determining that at least one of said media containers further encapsulates runnable code for processing at least some of the formatting of the media data structure in order to support playout of the audio or video content by the media engine, and running the code on a code engine of the receiving apparatus in order to perform said processing of the media data structure for input to the media engine. A processed version of the data structure, following the processing by at least said code, is input to the media engine in order to play out the media content.

In embodiments, the method may comprise identifying a capability the media engine is lacking for processing the formatting of the media data structure, and said determination may comprise determining that the runnable code encapsulated in the received container file supports said lacking capability. In embodiments, said running of the code may be performed on condition of said identification and determination.

In embodiments the delivered code may replace a corresponding component of the media engine (e.g. a decoder or decapsulating component), or may supplement such a component (e.g. to transcode the encoding scheme or convert the container format).

In embodiments the one or more media containers may comprise a sequence of media containers (e.g. segments or file chunks) each encapsulating a respective portion of the audio or video data, each according to said media container format.

In embodiments the receipt of the data structure may comprise receiving the data structure in a streamed manner.

In embodiments, one or both of the code engine and media engine may be incorporated in a web browser run on the receiving apparatus, or a plug-in to the web browser.

In embodiments, said content may be audio content, in which case said encoding scheme is an audio encoding scheme. In some such embodiments the media data structure may additionally comprise video encoded according to a video coding scheme.

In other embodiments said content may be video content and said encoding scheme may be a video encoding scheme. In some such embodiments the media data structure may additionally comprise audio encoded according to an audio coding scheme.

In embodiments, the media encoding scheme used in the received data structure is an ETSI standard or an MPEG standard.

In embodiments the audio encoding scheme used in the received media data structure may comprise one of:
  AC-4 (ETSI TS 103 190)
  AC-3 or EAC-3 (ETSI TS 102 366)
  MPEG-4 AAC (ISO/IEC 14496-3)
  MPEG-D USAC (ISO/IEC 23003-3)
  MPEG-H Audio (ISO/IEC 23008-3)

In embodiments, the container format may be an ISO Base Media File Format (ISOBMFF).

Note that an ISOBMFF file as referred to herein may refer to ISO/IEC 14496-12 or any extension or derivative thereof, such as MP4, 3GP, 3G2 or CMAF.

In embodiments the data structure may be streamed, said one or more media containers comprising a plurality of media containers each encapsulating a portion of the audio or video content according to said media container format. In such embodiments, the layers of formatting in the data structure further may comprise a third layer comprising a media presentation description file pointing to each of the plurality of media containers in the second layer, the media presentation description file being formatted according to a streaming format. For instance the streaming format may comprise MPEG-DASH or HLS.

In embodiments the code may take the form of a script and the code engine may be a script engine, which may be any form of virtual machine or sandboxed execution environment.

In embodiments the code may take the form of JavaScript. Alternatively other languages such as Webassembly could be used.

In embodiments said processing may comprise processing at least part of the formatting of the first layer.

In embodiments, said processing may comprises processing at least part of the formatting of the second layer.

In embodiments, the media engine may comprise no decoder capable of decoding the encoding scheme used in the received media resource; and said processing may comprise either: decoding the content for playout by the media engine, or transcoding the media content to a second encoding scheme which the media engine is capable of decoding.

For example, the second encoding scheme may comprise one of: an AAC standard, MP3, Opus, or a PCM scheme.

In embodiments, the media data structure may comprise multiple audio streams or multiple video streams, and said processing may comprise multiplexing the multiple audio streams into a same audio stream for playout via a same audio buffer of the media engine, or multiplexing the multiple video streams into a same video stream for playout via a same video buffer of the media engine.

In some such embodiments, the streams may take the form of different streams at the first layer (e.g. different substreams or channels), wherein the one or more media containers comprise a sequence of media containers each comprising a portion of each of said streams. In this case said multiplexing comprises multiplexing the portions form the multiple first-layer streams into a single stream for playout via a same audio buffer of the media engine, or similarly for video.

Alternatively the streams may take the form of streams from different sequences of said containers at the second layer. In this case said multiplexing may comprise multiplexing the different sequences into a single stream for playout via a same audio buffer of the media engine, or similarly for video.

In embodiments, for audio or video, the different streams may comprise a base layer stream and at least one enhancement layer stream, and the multiplexing may comprise combining the base layer stream and the at least one enhancement layer stream into one.

In embodiments, the media engine may not be capable of accessing the container format used in the received resource, and said processing may comprise converting to a second container format which the media engine is capable of accessing.

For example, the second container format may be MPEG-2 TS.

In embodiments the processed data structure may be input to the media engine via a web socket.

According to another aspect disclosed herein, there is provided a computer program comprising software embodied on computer-readable storage and configured so as when run on one or more processors of the receiving apparatus to perform a method in accordance with any of the embodiments disclosed herein.

According to another aspect disclosed herein, there is provided a receiving apparatus (e.g. user equipment) for performing the method of any embodiment disclosed herein, the receiving apparatus comprising: an interface for the receipt of the media data structure; a controller configured to perform said determination; the code engine, being arranged to perform said running of the code; and the media engine, being arranged to perform said playout of the media content following said processing.

According to another aspect disclosed herein, there is provided a method of supplying media, the method comprising: outputting a media data structure for receipt by a receiving apparatus, the media data structure comprising audio or video content formatted in a plurality of layers, including at least a first layer encoding the audio or video content according to an audio or video encoding scheme respectively, and a second layer encapsulating the encoded content in one or more media containers according to a media container format; wherein at least one of the media containers further encapsulates runnable code for processing at least some of the formatting of the media data structure in order to support playout of the audio or video content by a media engine of the receiving apparatus.

The method of supplying may be performed by a generator of the media resource or a forwarding provider of the media resource.

According to another aspect disclosed herein, there is provided apparatus (e.g. a server) for generating a media data structure, the apparatus comprising one or more processors and storage storing code arranged to run on at least one of the one or more processors; the code being configured so as when thus run to perform operations of: generating a media data structure comprising audio or video content formatted in a plurality of layers, including at least a first layer encoding the audio or video content according to an audio or video encoding scheme respectively, and a second layer encapsulating the encoded content in one or more media containers according to a media container format; and further encapsulating, in at least one of the media containers, runnable code for processing at least part of the formatting of the media data structure in order to support playout of the audio or video content by a media engine.

In embodiments the outputting or generating of the media data structure may comprise outputting or generating a media resource having any of the properties disclosed from the perspective of the receive-side method, program or apparatus.

According to another aspect disclosed herein, there is provided a media data structure embodied on computer-readable storage, the media data structure comprising: audio or video content formatted in a plurality of layers, including at least a first layer encoding the audio or video content according to an audio or video encoding scheme respectively, and a second layer encapsulating the encoded content in one or more media containers according to a media container format; and encapsulated in at least one of the media containers, runnable code for processing at least part of the formatting of the media data structure in order to support playout of the audio or video content by a media engine In embodiments the media data structure may have any of the properties disclosed in relation to the method, apparatus or program.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1A:
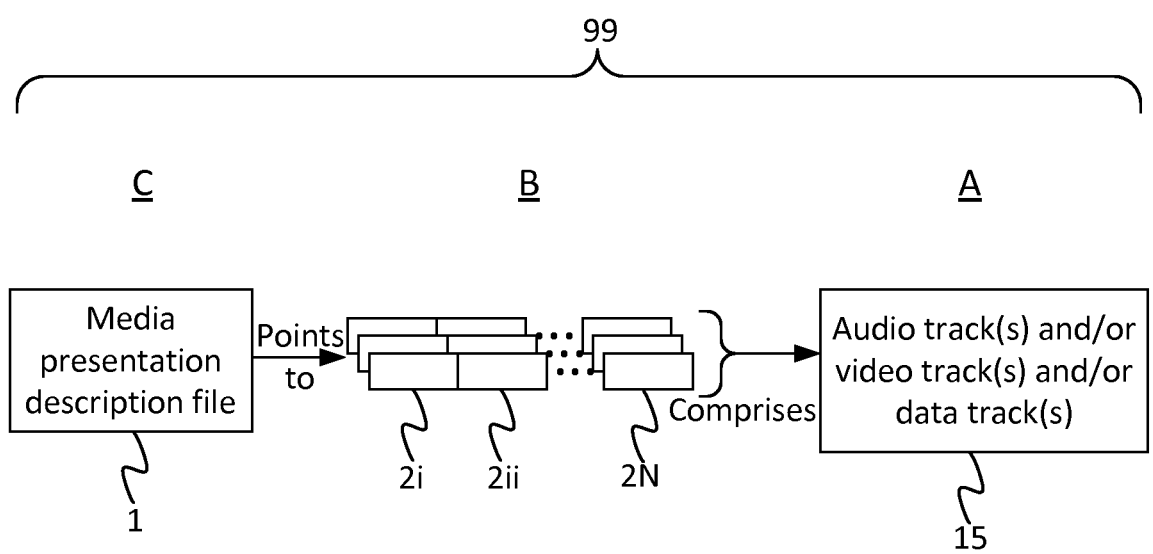
FIG. 1A is a schematic representation of a protocol for streaming media.

In various media playback environments, the media engine may be lacking in certain components which are needed to enable a certain experience, such as personalized audio, decoding of bitstreams encoded in certain encoding formats, etc. For instance, OTT ("over the top") players for playback of streaming content are increasingly implemented in the form of JavaScript running in a browser. However, a drawback of these widely deployed systems is that they typically do not implement the latest audio or video decoders, which may be needed to decode a certain type of a bitstream. Therefore, enabling a certain experience such as personalized audio, additional tracks, or the latest standards, etc., may only be possible to some extent, or in some cases the content cannot be played out at all.

Further, streaming providers such as OTT providers need to create various "flavours" of one and the same content in order to service multiple different types of devices (e.g. Android, iOS, STBs, TVs, etc.). These flavours of content do not only vary in terms of which types of elementary bitstream(s) they include, but are also packaged into certain container formats depending on the device to be served, such as ISOBMFF for DASH-like streaming or HLS for delivery to iOS devices. MPEG has recently published the first version of its CMAF standard (Common Media Application Format), which aims to unify at least the container-formats. However, it is not expected that this will be widely deployed in the near future.

It is recognized herein that issues such as these could be addressed by embedding content-specific pieces of JavaScript (or other code) in the media container, to be executed in the browser or other media-engine environment at the receive side. E.g. this may be enabled by the ability to include, and therefore transport, web-based content such as JavaScript in ISOBMFF. For instance the embedded script or code may be configured to perform any one or more of the following tasks:

multiplexing multi-stream audio into single stream audio (or similarly for video), in order to overcome limitation in current browsers whereby one media-type is tied to one media-source buffer (e.g. all audio goes through one audio buffer);

converting one container type to another container type, such as converting ISOBMFF segments or files into MPEG-2-TS conformant segments or files, in order to remove the need to send a specific container-format depending on the target device; and/or decoding or transcoding media encoding types where no suitable decoder exists in the current media-engine, in order to be able to playback those media types. One example for this would be that, if a media-engine does not support newer formats such as AC-4, MPEG-H Audio or MPEG-D USAC, such code could be used to decode such formats into a format that is understood by the legacy media-engine (e.g. PCM audio).

Media containers can therefore be used to encapsulate not only the media itself, but also everything that is needed for playing back the contained media. As a consequence, media-experiences can be enabled in a receiving device which would not otherwise have the capabilities for the same experience without the embedded script (or other such embedded code). In other words, the disclosed techniques provide for "self-descriptive" media. The presently disclosed techniques exploit the ability to embed JavaScript or the like in order to add "self-reflective" code that (conditional on device capabilities and other parameters) acts upon the media container itself in which it was contained. Such techniques for example could find an application in the OTT space, or any other scenario for transporting or storing audio or video media.

Figure 1B:
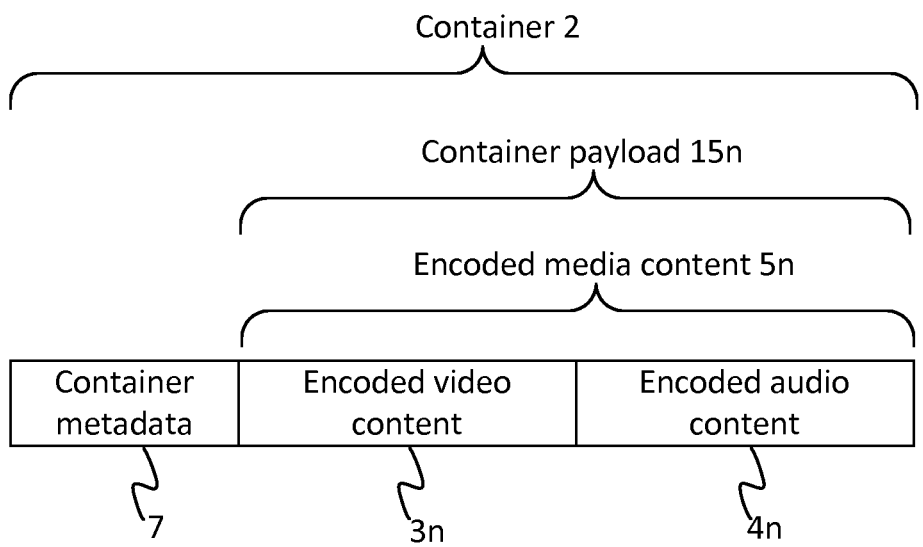
FIG. 1B is a schematic representation of a media container.

FIGS. 1A and 1B illustrate an example of a data structure 99 for transporting or storing audio and/or video ("AV") media data. The media data structure 99 could represent for example a given film, episode of a TV show, a tune or song, or an audio or video clip, or any item of media that a provider wishes to provide to a receiving apparatus (e.g. user playback device). The data structure 99 comprises a plurality of layers of formatting, including at least a first layer A and a second layer B. The second layer B comprises one or more media containers 2 which between them contain payload data 15. The payload data 15 comprises encoded media content 5 in the form of audio content 4 and/or video content 3 encoded according to an audio and/or video encoding scheme respectively (i.e. an audio encoding scheme for the audio and/or a video encoding scheme for the video). This is the first (lower) layer of formatting A (the encoding scheme could also be called an encoding format or compression format). For example, for audio the encoding scheme may comprise MP3, AC-4, MPEG-D USAC or an MPEG-H audio standard; and/or for video the encoding may comprise H.264, HEVC, etc. The audio content 4 may comprise one or more audio tracks, and/or the video content 3 may comprise one or more video tracks. For instance, in the case of multiple audio tracks, these could comprise for example a music track, a speech track, an effects track and/or a commentary track. Optionally the payload data 15 may also comprise one or more data tracks, such as subtitles, overlay graphics, interactive content, etc.

In many cases such as a streamed scenario, at the second layer B the data structure 99 comprises at least one sequence of containers $2i$, $2ii$, ..., $2N$. In this case each media container 2 wraps up a different respective portion $15n$ of the payload data 15, each container 2 formatted according to a media container format such as ISOBMFF or MPEG-2 TS. For example this would be the case in a streaming scenario, whereby the media data structure 99 is divided into a plurality of pieces, sometimes called segments or file chunks, for streaming to the receiving apparatus. In each individual container 2, the individual payload $15n$ of the container 2 comprises a different respective portion $5n$ of the encoded media content 5. In the generalized case this may comprise a respective portion $4n$ of each of the audio track(s) 4 and/or respective portion $3n$ of each of the video track(s) 3.

In the case of multiple media tracks, there are at least two possibilities. The first is that the data structure 99 comprises multiple sequences of containers, as illustrated in FIG. 1A. In this case each sequence of containers may contain the content of only one track, or at least only one type of media (only audio or only video). This would be the case for example for MPEG-DASH like scenarios, where a "chunk" 2 would only contain data for either audio or video. The client downloads those separately and supplies them in a timely synchronized manner to the respective decoders (audio decoder and video decoder). In such arrangements the payload data 15 of a given sequence at the first layer A is sometimes referred to in the art as the elementary bitstream.

The second possibility is that the data structure 99 comprises only one sequence of containers 2, and instead the individual payload $15n$ of each container 2 comprises a portion of each of the tracks (e.g. if there are two audio tracks and one video track, each container 2 of a given sequence would contain a different respective portion of the first audio track, a different respective portion of the second audio track, and a different respective portion of the video track). By way of example, HLS would support either the first or the second possibility. It is also possible to combine the first and second possibilities, i.e. the data structure 99 may comprise multiple container sequences, and in at least a given one of the sequences, each container 2 in that sequence may contain a respective portion of each of a subset of the total tracks carried in the data structure 99. For example one container sequence may contain two or more audio tracks 4, whilst another container sequence of the same data structure 99 may contain one or more video tracks.

Whatever the number of tracks and the number of container sequences used to transport them, each container 2 further comprises a respective portion of container metadata 7 wrapping up its respective portion $5n$ of the encoded media content 5 (the audio content 4 and/or video content 3). The metadata 7 may for instance specify a type or types of the content wrapped up in the respective container, e.g. audio, video and/or non-AV data. The metadata 7 may specify the encoding format used for each of the pieces of content wrapped up in the respective container, e.g. AC-4 for audio and/or HEVC for video. The metadata 7 may specify a data position and/or size of the container in the container; e.g. starts at byte X and/or has length Y. So for example the metadata 7 may specify something like: audio track of format I (e.g. AC-4) starts at byte X for Y bytes, video track of format II (e.g. HEVC) starts at byte V for W bytes, etc.

To give further examples, depending on the container format, the metadata 7 may lists other details on the encoding format of the audio and/or video used in the encoded content contained in the respective container. For instance for audio, the metadata 7 may specify a number of channels and/or sampling rate used at the encoding layer. And/or for video, the metadata 7 may specify an aspect ratio and/or number of frames per second used in the encoding layer.

Each container 2, including the metadata 7, is formatted according to a suitable media container format. For instance the container format may comprise an ISOBMFF based format, meaning ISO/IEC 14496-12 or any extension or derivative thereof, such as MP4, 3GP, 3G2 or CMAF. As another example, the container format may comprise MPEG-2 TS. The container format is sometimes also called file-format and an individual container is sometimes referred to as a file (or file chunk), but note that in the present context this does not imply being stored permanently in that form at the transmit or receive side, nor being a file individually accessible to the user through the file system of their operating system. The bitstream at the second layer B, comprising the container(s) 2 including the container metadata 7, is sometimes referred to in the art as the transport bitstream.

Optionally, for a streaming scenario, the data structure 99 may comprise a third layer C above the second layer B, hierarchically speaking. This comprises a media presentation descriptor file 1 formatted according to a streaming format such as MPEG-DASH or HLS. This descriptor file 1 comprises a respective pointer to each of the media containers 2 of one or more container sequences stored on the transmitting apparatus (e.g. server). When a streaming event is initiated, before playback starts, the receiving apparatus downloads the media presentation descriptor file 1 (from the same server serving the rest of the data structure 99) and uses this to subsequently fetch the containers 2 of the streamed data structure 99 from the server or other such transmitting apparatus in streamed manner. In some cases there is also provided a mechanism to signal changes in the media presentation description file 1 to the receiving apparatus and force it to download it again. For instance the descriptor file 1 may be downloaded again in order to refresh it upon an event such as a timer expiring (e.g. the .mpd file 1 in DASH can specify "please fetch me again after 2 minutes to check if there are updates" etc.).

Figure 1C:
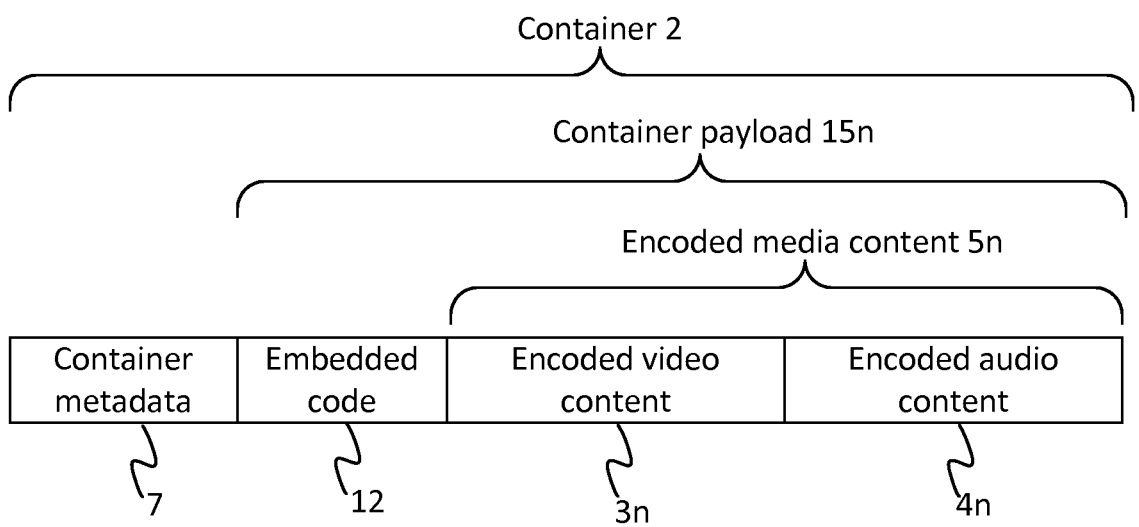
FIG. 1C is another schematic representation of a media container.

As mentioned previously, the payload 15n of a container 2 can also comprise a data track or part thereof (not shown in FIG. 1B). As shown in FIG. 1C, the data track can be used to include runnable code (e.g. a runnable script) 12 such as JavaScript. According to the present disclosure, an embedded script 12 in at least one of the media containers 2 is used to provide an additional component for processing some or all of the formatting of one or more of the layers A, B, C of the received data structure 99 itself. This script comprises the additional component included explicitly in the media container(s) 2, e.g. the ISOBMFF container (or MPEG-2 TS container, or such like). Thus, when received by a receiving apparatus whose media engine does not in itself have all the components necessary to access the full formatting of the received data structure 99, then the receiving apparatus can instead extract the embedded code and run this in order to provide the otherwise-missing functionality.

Figure 1D:
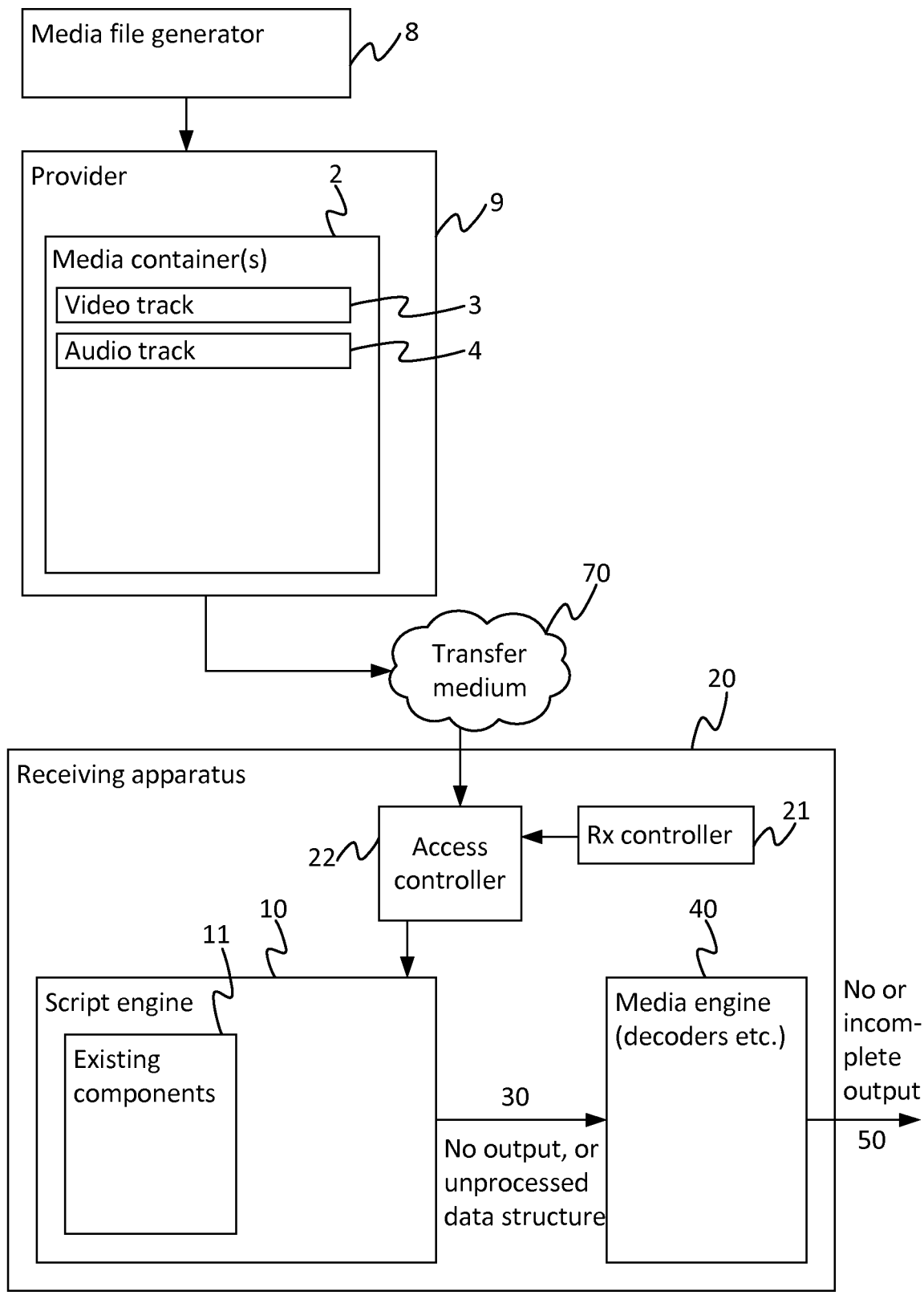
FIG. 1D is a schematic block diagram of a communication system.
Figure 1E:
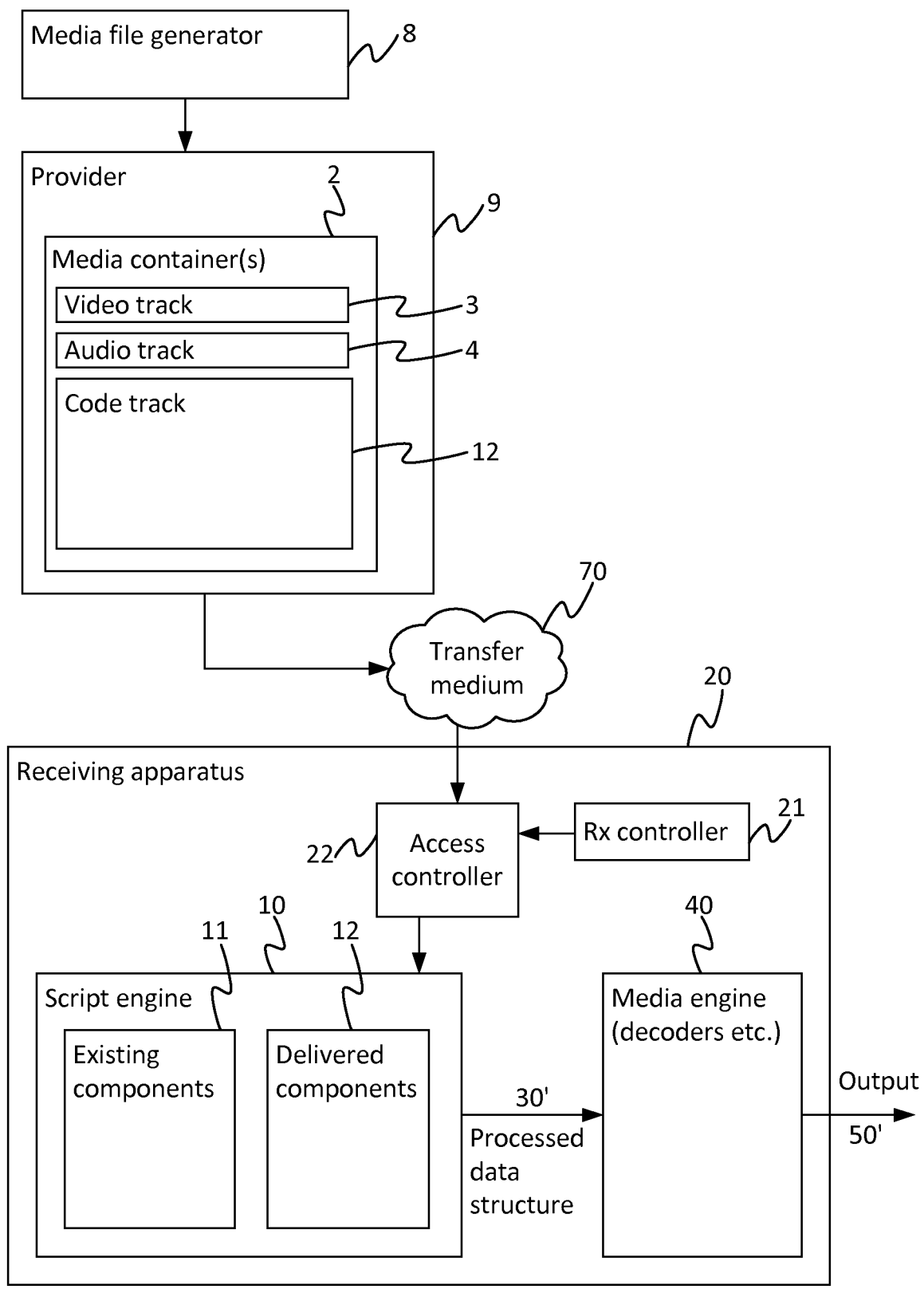
FIG. 1E is another schematic block diagram of a communication system.

This idea is illustrated further in FIGS. 1D and 1E. FIG. 1D shows a communication system in which the receiving apparatus 20 is lacking one or more components needed to access all the formatting of a received data structure 99. The communication system comprises: a generating apparatus 8 of a generator of the media data structure 99, a providing apparatus 9 (e.g. transmitting apparatus) of a provider of the media data structure 99, a receiving apparatus 20 for receiving the data structure 99 and playing out the content wrapped up therein, and a transfer medium 70 such as a network or transferrable storage medium via which the receiving apparatus 20 receives the data structure 99 from the providing apparatus 9.

Each of the generating apparatus 8 and providing apparatus 9 may comprise one or more devices, e.g. one or more servers and/or user terminals. The providing apparatus 9 may be separate from, or the same as, or partially coincident with, the generating apparatus 8. The providing party (the provider) may be the same as, different than, or partially coincident with, the generating party (the generator). In embodiments the providing apparatus 9 comprises a server such as a web server arranged to supply content to be consumed via web-browsers. Note also that the term "server" as used herein may refer to an entity implemented as one or more physical server units at one or more geographical sites. Distributed storage and computing techniques in themselves are known in the art.

The receiving apparatus 20 may comprise one or more devices including at least one user playout device. In embodiments it may take the form of a single user playout device, e.g. a desktop or laptop computer, tablet, smartphone, dedicated media player device, or smart TV, etc. In other embodiments the receiving apparatus 20 may comprise a plurality of individual devices, e.g. a first device to perform some or all of the processing of the received data structure 99 and one or more other, second devices connected to the first device for performing any remaining processing and playing out the decoded media. For instance the first device could comprise a set-top box (STB) and the second device could comprise a TV set. Or as another example, the first device could comprise a desktop computer, laptop, tablet or smart phone, and the second device(s) could comprise a home media system. In embodiments the receiving apparatus 20 may a network of media devices distributed throughout the home, office or other venue. Again it is noted that distributed computing techniques are, in themselves, known in the art. In some embodiments the receiving apparatus 20 may even take the form of a system for public consumption of media such as cinema.

The providing apparatus 9 is arranged to provide the data structure 99 comprising the one or more containers 2 to the receiving apparatus 20 via the transfer medium 70, for processing and playout by the receiving apparatus 20. A given container 2 is shown in FIG. 1D onwards, but it will be appreciated that similar teachings may apply in relation to each of the media containers 2. In embodiments the transfer medium 70 comprises a data network, e.g. a wide-area packet-switched network such as the Internet and/or a mobile cellular network such as a 3GPP network. In such embodiments the providing apparatus 9 is arranged to transmit the data structure 99 to the receiving apparatus 20 over the network 70 (e.g. Internet), e.g. in a streamed manner. For instance the provider may comprise an "over the top" (OTT) content provider such as a video or audio streaming service supplying streamed video and/or audio content over the Internet, e.g. streaming movies, TV shows or songs/tunes on demand, etc. In alternative embodiments however, it is not excluded that the transfer medium 70 instead comprises a transferrable storage device such as a memory stick, removable drive or CD. In this case the provider apparatus 9 stores the data structure 99 on the storage medium, which is then transferred to the receiving apparatus to read the data structure from the storage medium.

In embodiments, the receiving apparatus 20 comprises: a receive controller 21, an access controller 22, a code engine 10, and a media engine 40. Each of these elements may be implemented in the form of software stored on computer-readable storage of the receiving apparatus 20 and arranged to run on one or more processors of the receiving apparatus 20. The storage on which the elements 10, 21, 22, 40 are stored may for example comprise a magnetic storage unit comprising a magnetic storage medium such as a hard disk, an electronic storage unit comprising an electronic storage medium such as flash memory or other EEPROM (a solid state drive), or a combination of one or more storage units employing one or more storage media. The one or more processors on which the elements 10, 21, 22, 40 are run may for example comprise one or more CPUs, co-processors, GPUs or other work accelerator processors, etc. In alternatively implementations, it is not excluded that some or all of the elements 10, 21, 22, 40 could instead be implemented in dedicated hardware circuitry, or configurable or reconfigurable circuitry such as a PGA or FPGA; or any combination of hardware and software.

The code engine 10 is a functional module for running code formulated in one or more languages. The code engine 10 may take the form of a script engine, which may refer to any form of virtual machine or sandboxed execution environment for interpreting or compiling code (e.g. based on just-in-time compilation). In embodiments any one, some or all of the elements 10, 21, 22, 40 may be part of a web browser, or a plug-in to a web-browser, or a combination thereof. In such embodiments the access controller 22 may take the form of an HTTP access controller. The script engine 10 may be an inherent script engine of the web browser, or a plug-in to the web browser. The media engine 40 may take the form of a separate application such as a dedicated media player application or a VoIP application, or a plug-in application to web browser, to which the script engine 10 interfaces via a suitable API (application programming interface). Alternatively in some embodiments the media engine 40 may take the form of one of the scripts run on the script engine 10.

The receive controller 21 is configured to determine which data to receive from the transfer medium 70, and to control the access controller 22 to retrieve the determined data (the data structure 99) from the transfer medium 70 accordingly. For instance in embodiments where these elements 21, 22 are part of a web browser, the determination of what to retrieve may be based on the user of the receiving apparatus 20 selecting, via the web browser, to visit a certain web site or page, or selecting a certain user-selectable control within a web page, or such like. The script engine 10 may comprise a JavaScript engine for running JavaScript.

In the case where the transfer medium 70 comprises a network such as the Internet, the receive controller 21 comprises a download controller for determining what to download, and the receiving of the data structure (and containers 2 thereof) comprises downloading the data structure 99 from the providing apparatus 9 (e.g. server) via the network 70 (e.g. Internet). In embodiments this downloading comprises downloading in a streamed manner, and the download controller 21 comprises a streaming controller. Alternatively it is not excluded that the downloading comprises downloading the data structure 99 in one go and storing as a whole prior to playout (though note the term "download" as used herein does not limit to this and more generally can be used to cover downloading media in a streamed manner as well).

The access controller 22 is configured to supply the media containers 2 of the received data structure 99 to the script engine 10. The script engine 10 forwards the received data structure 99 to the media engine 40 for playout of the audio and/or video content 3,4 encapsulated and encoded therein. The script engine 10 is arranged to run script (e.g. JavaScript) pre-stored locally on the receiving apparatus 20, this script providing one or more pre-existing components 11. The existing components 11 may for example comprise an API which forwards media data structure 99 (or at least parts thereof) to the media engine 40 for playout. However, in some cases none of these pre-existing components 11 may recognize the formatting of the received data structure 99, or at least not fully so. The existing components may 11 may comprise a component which identifies whether the data structure has a format supported by the media engine 40, and if not terminates the process without forwarding to the media engine 40. Alternatively the existing components 11 may still forward the data structure 99 (or parts thereof) to the media engine 40 in a form 30 that the media engine 40 cannot process, or at least not fully. As a result, the output 50 of the media engine 40 comprises no output, or no more than a partial output.

There are a number of potential reasons why a format might be unsupported. For instance, the media engine 40 may be unable to process the media container format of the incoming media container(s) 2. E.g. the media engine 40 may be unable to process ISOBMFF (perhaps only able to process another container format such as MPEG-2 TS), or the media engine 40 may be able to process the basic ISOBMFF standard ISO/IEC 14496-12 but not extensions thereof. In other examples, the media engine 40 may be able to fully process the container format of the container(s) 2, but unable to decode the encoding scheme used to encode the audio and/or media content 3, 4 within the container(s) 2. In another example, the media may comprise multiple streams of the same type (i.e. multiple audio streams or multiple video streams), but the media engine 40 may only comprise one buffer for each media type (one audio buffer and one video buffer). In this case only one of the audio streams and/or only one of the video streams may be played out by the media engine, leading to an incomplete experience.

To address such issues or similar, the generating apparatus 8 or providing apparatus 9 is configured to embed runnable code such as a script (e.g. JavaScript) 12 into at least one of the one or more containers 2 of the data structure 99. The following will be exemplified in terms of a script such as JavaScript. The embedded script 12 is configured so as, when run at the receive side, to provide one or more components that the media engine 40 might potentially be lacking. The script engine 10 is configured to extract and run the embedded script 12 on the receiving apparatus 20. Thus the additional component(s) required for processing the media data structure 99 are delivered to the receiving apparatus 20 via the container format of the media data structure 99 itself.

This additional processing may comprise, for example, converting the container format of the received media container(s) 2 to a format recognized by the media engine 40. E.g. this could be to convert from ISOBMFF to MPEG-2 TS. In other alternative or additional examples, one of the components delivered by means of the script 12 may be configured to transcode the encoded audio and/or video content to an encoding scheme which the media engine 40 is capable of decoding, or to decode the encoded audio and/or video so as to supply the decoded media straight to the media engine 40 for playout. E.g. one of the delivered components 12 may transcode from AC-4, MPEG-D USAC, or an MPEG-H standard, to an earlier encoding standard such as MP3 encoding; or from AC-4, MPEG-D USAC or MPEG-H direct to PCM (pulse code modulation). In yet further alternative or additional examples, the delivered component 12 may be configured to multiplex multiple audio streams in the received media into the same audio stream for playout through the same audio buffer of the media engine 40, and/or to multiplex multiple video streams in the received media into the same video stream for playout through the same video buffer of the media engine 40. This may advantageously overcome the limitation in current browsers whereby one media-type is tied to one media-source buffer (all audio goes through one audio buffer, or all video goes through one video buffer).

Whatever form the additional processing takes, the script engine 10 then inputs the processed version 30' of the data structure 99—following processing the delivered component(s) 12—to the media engine 40 for playout 50' of the audio and/or video media content. In general, depending on the additional processing, the processed data structure 30' input to the media engine 40 could be the decoded media content, or transcoded media, or media in any format processable by the media engine 40.

FIGS. 1F and 2 to 4 illustrate an example of an ISOBMFF download. In this example the received media data structure 99 comprises just a single container 2 in the form of an ISOMBFF file, the providing apparatus 9 takes the form of a server, the transfer medium 70 takes the form of a network 70 such as the Internet, and the receive controller 21 takes the form of a download controller. Optionally the providing apparatus 9 may take the form of a web server, the access controller 22 may take the form of an HTTP access controller, and at least the script engine 10 may be the script engine of a web browser, e.g. a JavaScript engine.

Figure 1F:
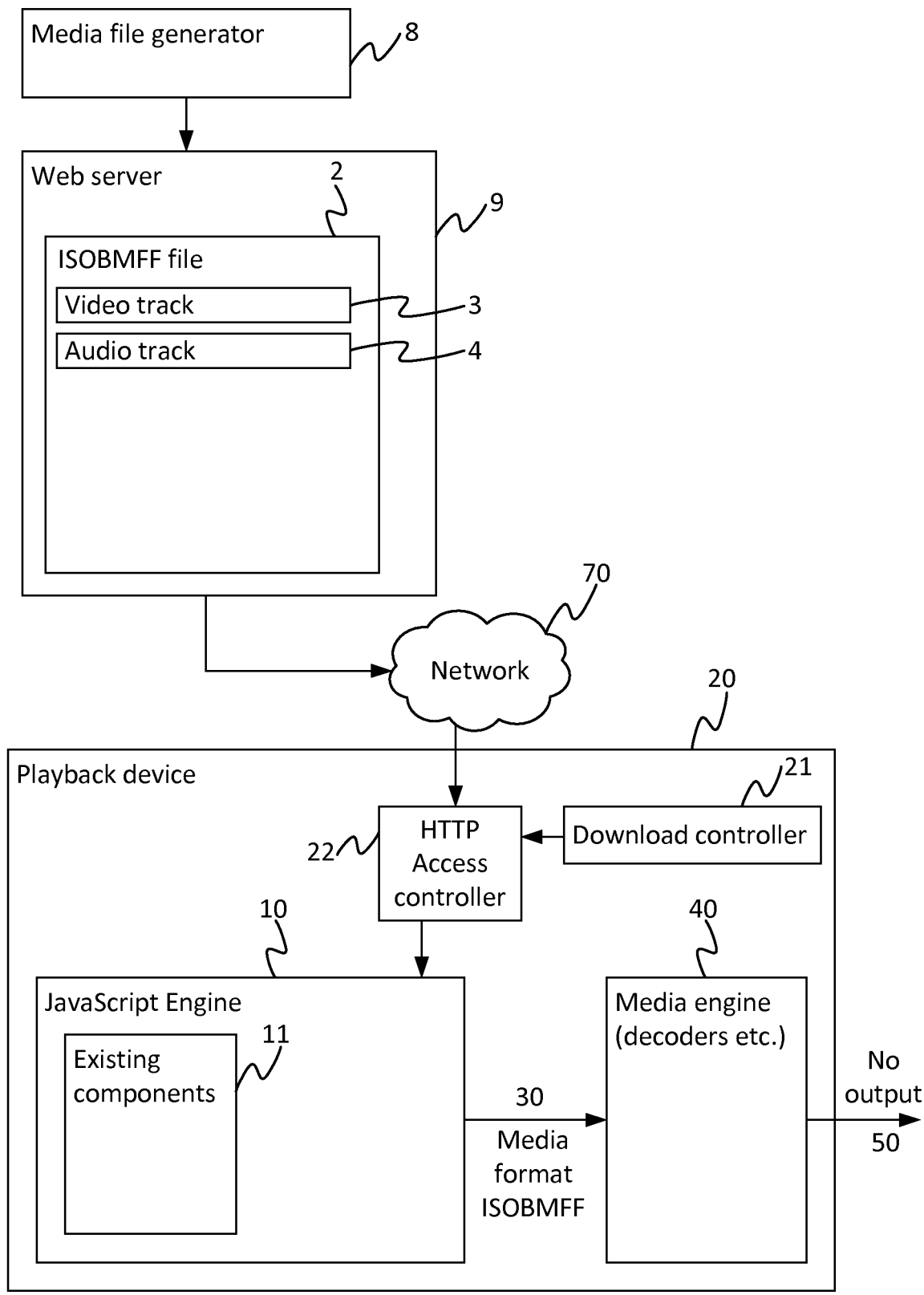
FIG. 1F is a schematic block diagram of a system for downloading media.

FIG. 1F shows the case where there is no embedded script 12 in the ISOBMFF file and the media engine 40 is not capable of processing ISOBMFF (e.g. instead only being able to process MPEG-2 TS). The existing components 11 run on the script engine 10 either identify that the received data structure 99 comprises a container format which the media engine 40 is not capable of decapsulating and terminates the process, or else they simply forward the received media data structure 99 straight to the media engine 40 in a format (ISOBMFF) which the media engine 40 cannot process. Either way, this results in no media output 50 from the media engine 40.

Figure 2:
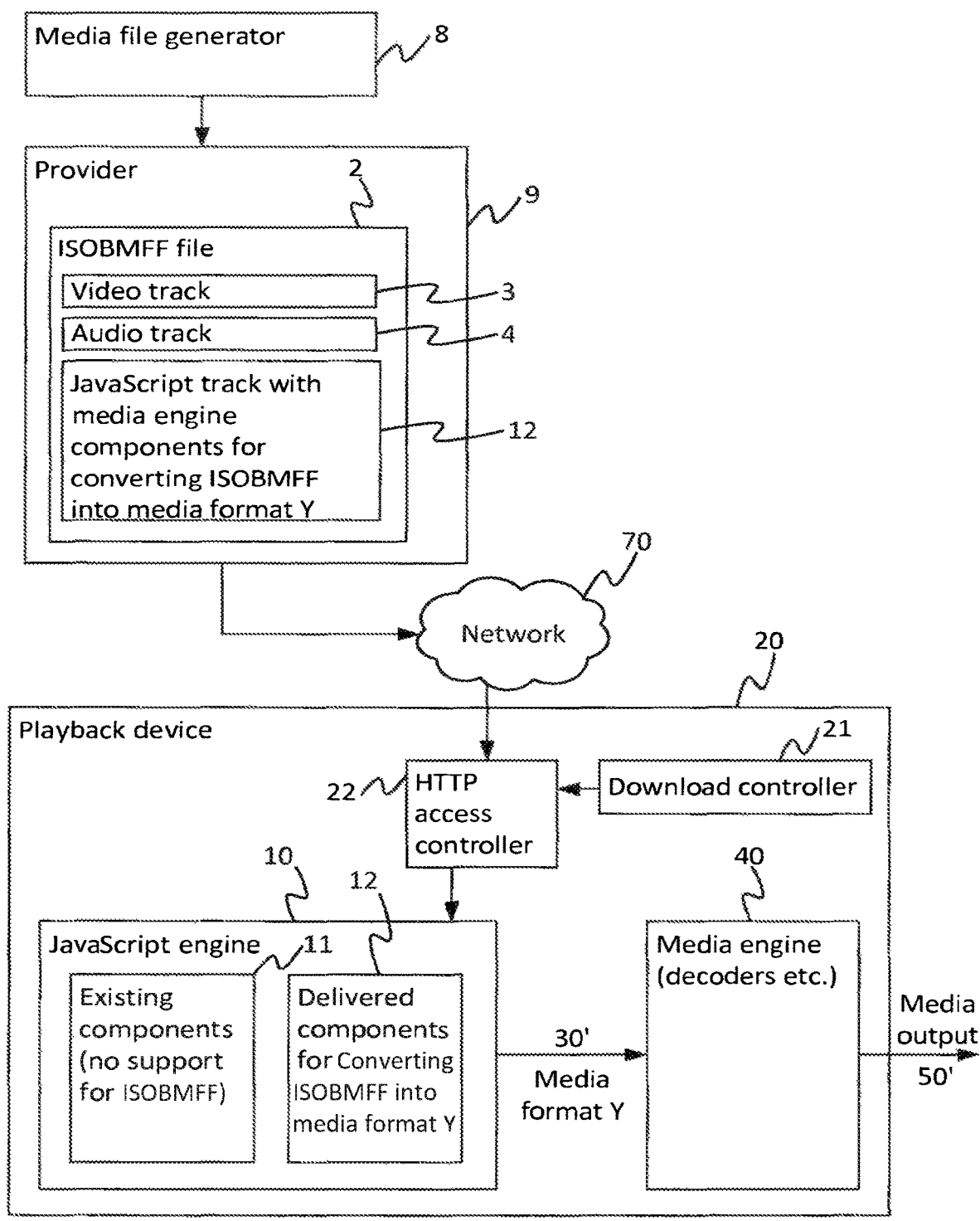
FIG. 2 is another schematic block diagram of a system for downloading media.

FIG. 2 illustrates a corresponding scenario but where a suitable conversion script 12 is embedded in the media data structure 99 in accordance with embodiments disclosed herein. The script engine 10 is configured to identify that the media engine 40 is not capable of processing the media container format of the received data structure 99, but also that the received media data structure 99 contains an embedded script 12 capable of converting the received container format to a container format that is recognized (e.g. ISOBMFF to MPEG-2 TS). In response, the script engine 10 extracts and runs the script 12 in order to process the container format of the received data structure 99 for input 30' to the media engine 40. The media engine 40 is then able to decapsulate the converted container format, decode the encoded content therein, and output the decoded content 50'. Note: in such embodiments, the script engine 10 would have to understand some aspect of the container format (e.g. ISOBMFF) in general, but may not understand the specific variant of it (e.g. one of the extensions to ISOBMFF).

Figure 3:
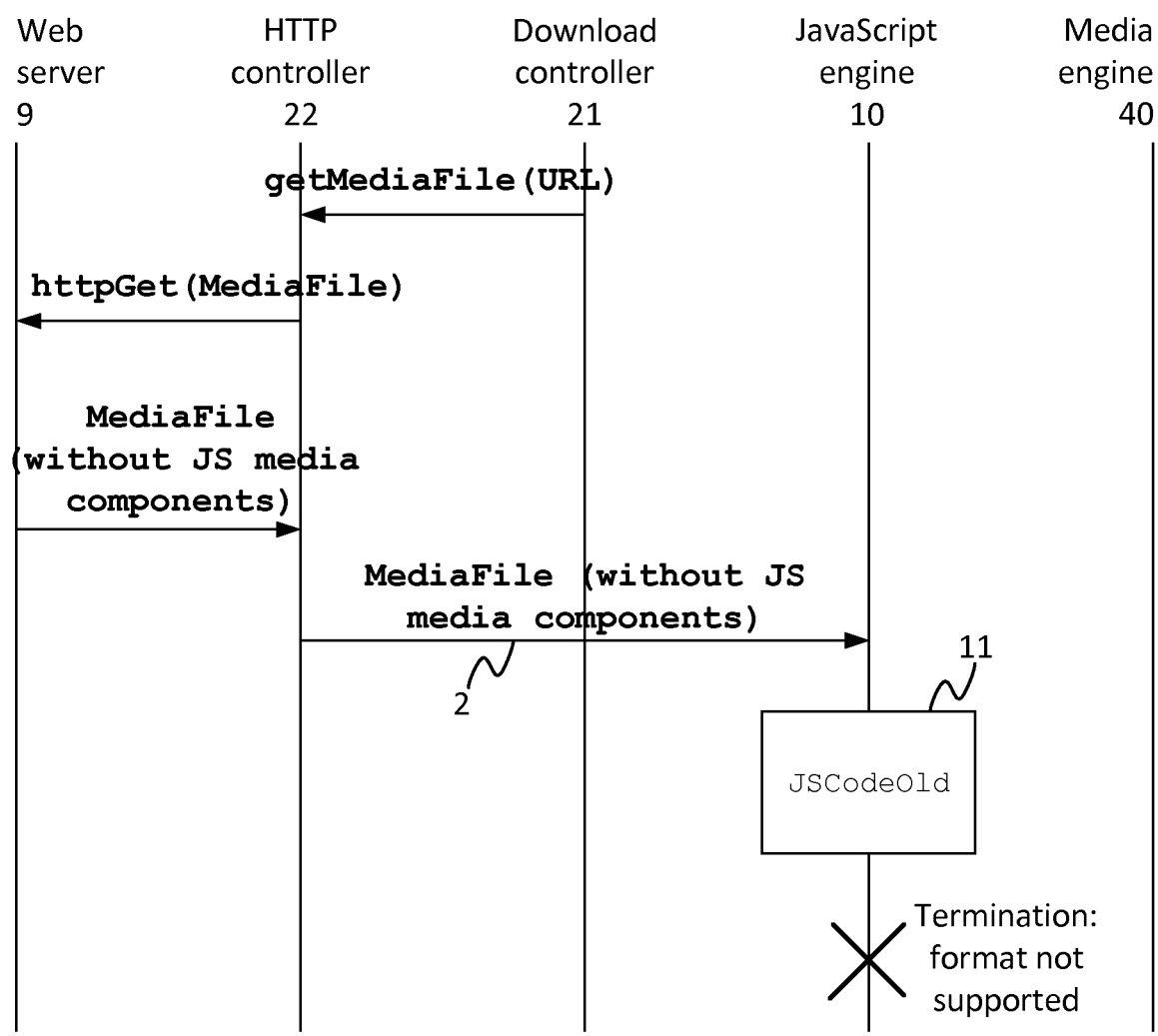
FIG. 3 is a schematic signalling diagram of a method of downloading media.
Figure 4:
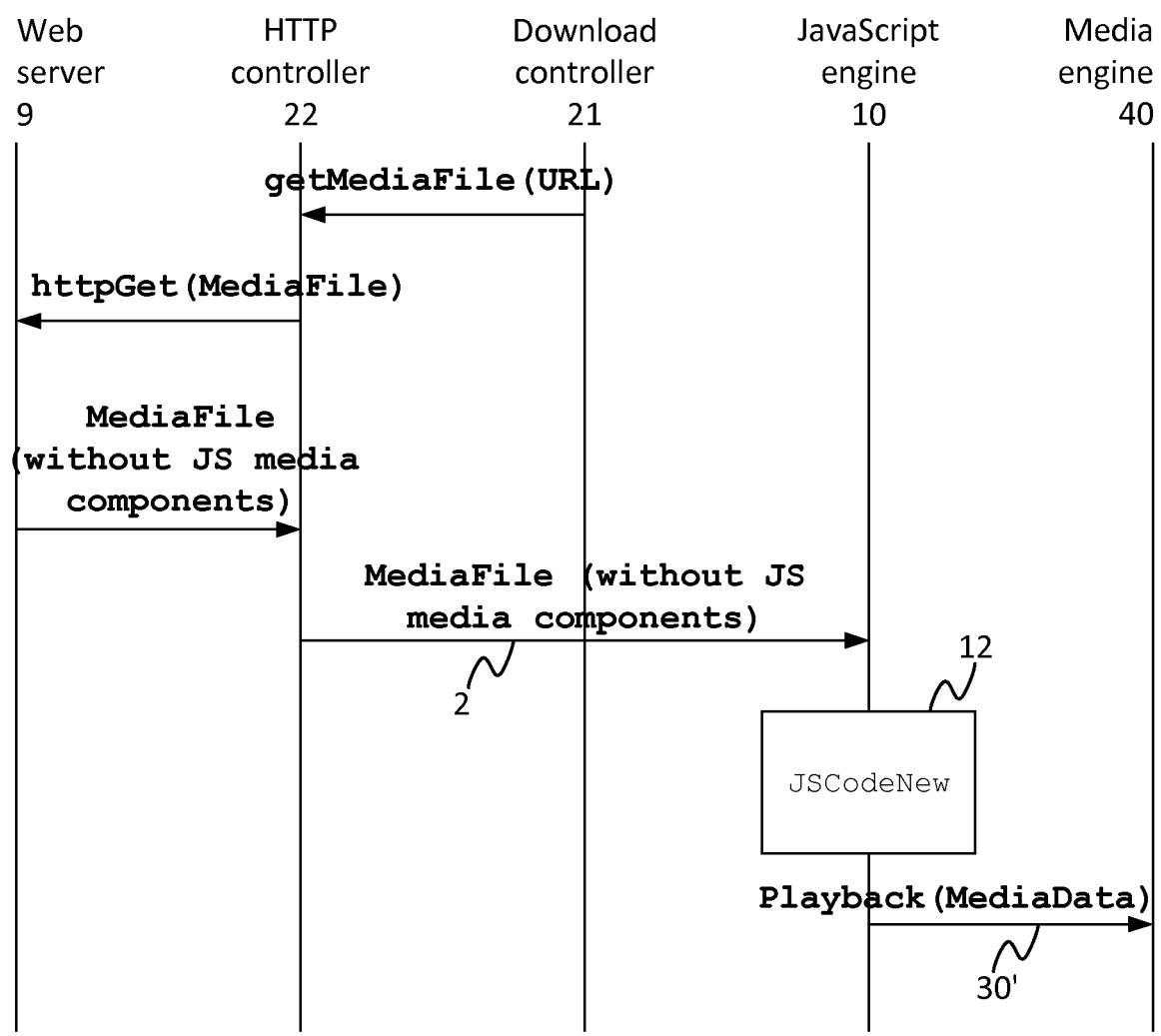
FIG. 4 is a schematic signalling diagram of another method of downloading media.

FIGS. 3 and 4 show signalling charts corresponding to the block diagrams of FIGS. 1F and 2 respectively. In the process of FIG. 3, in a first step the download controller 21 sends a command getMediaFile(URL) to the access controller 22 instructing it to download a media container 2, e.g. file. In a second step following the first step, the access controller 22 sends a request httpGet(MediaFile) to the server 9 requesting the media file 2. In a third step following the second step, the server 9 returns the media file 2 to the access controller 22 in response to the request. In this case the media file 2 does not contain an embedded script 12. In a fourth step following the third step, the access controller 22 forwards the received file 2 to the script engine 10. In a fifth step following the fourth step, one of the existing components 11 run on the script engine 10 identifies that the media container format of the received file 2 is not supported by the media engine 40 and terminates the process. There is therefore not corresponding media output from the media engine 40.

FIG. 4 illustrates a process in which the first to fourth steps are the same as in FIG. 3, except the received file 2 does contain the embedded script. In this case, in a fifth step following the fourth step, the additional component provided by the script 12 run on the script engine 10 converts the media container format of the received file 2 into a format supported by the media engine 40. In a sixth step following the fifth step, the additional component 12 forwards the converted-format media to the media engine 40 for playout. The media engine 40 therefore successfully outputs the media content.

Figure 5:
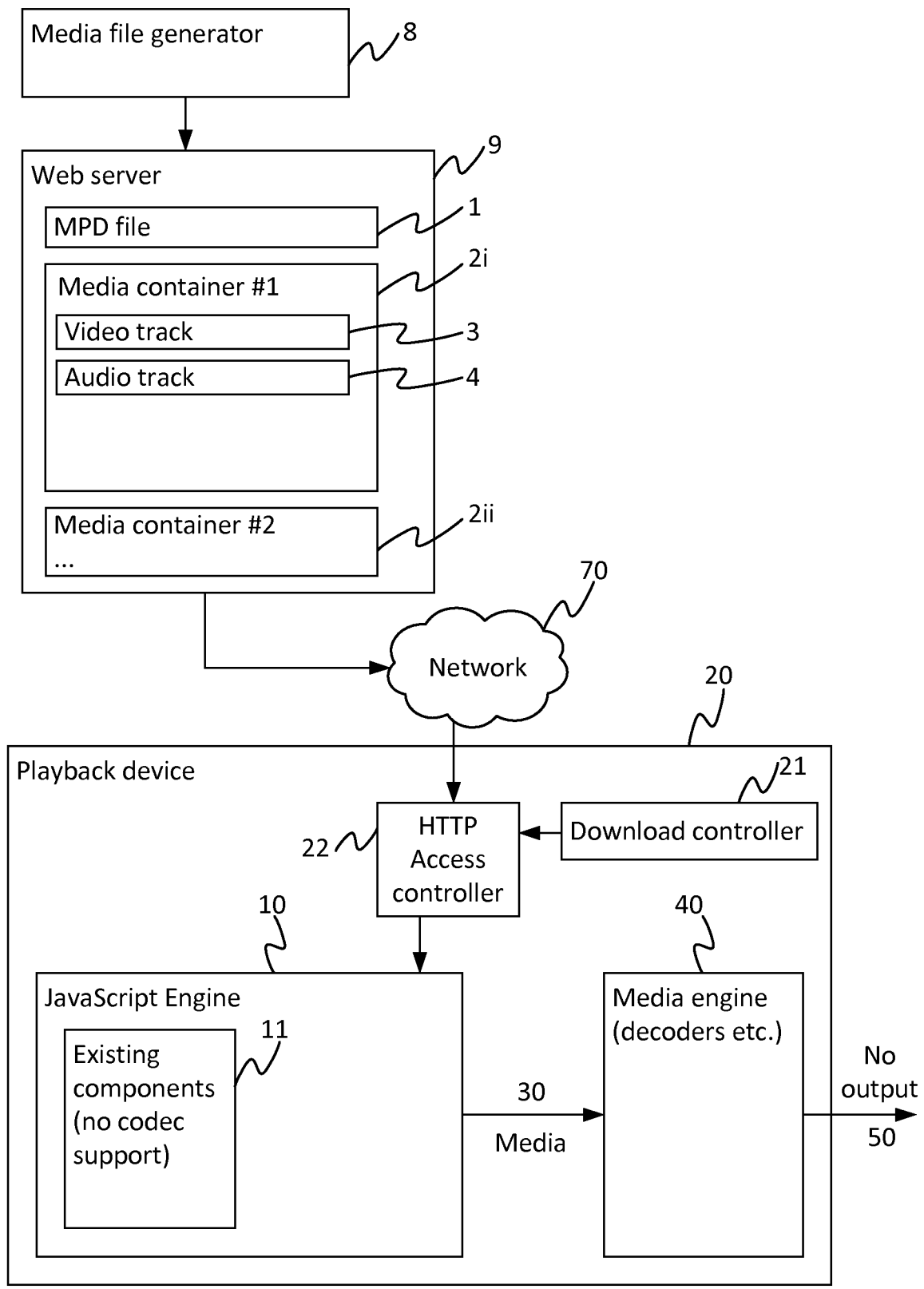
FIG. 5 is a schematic block diagram of a system for streaming media.
Figure 6:
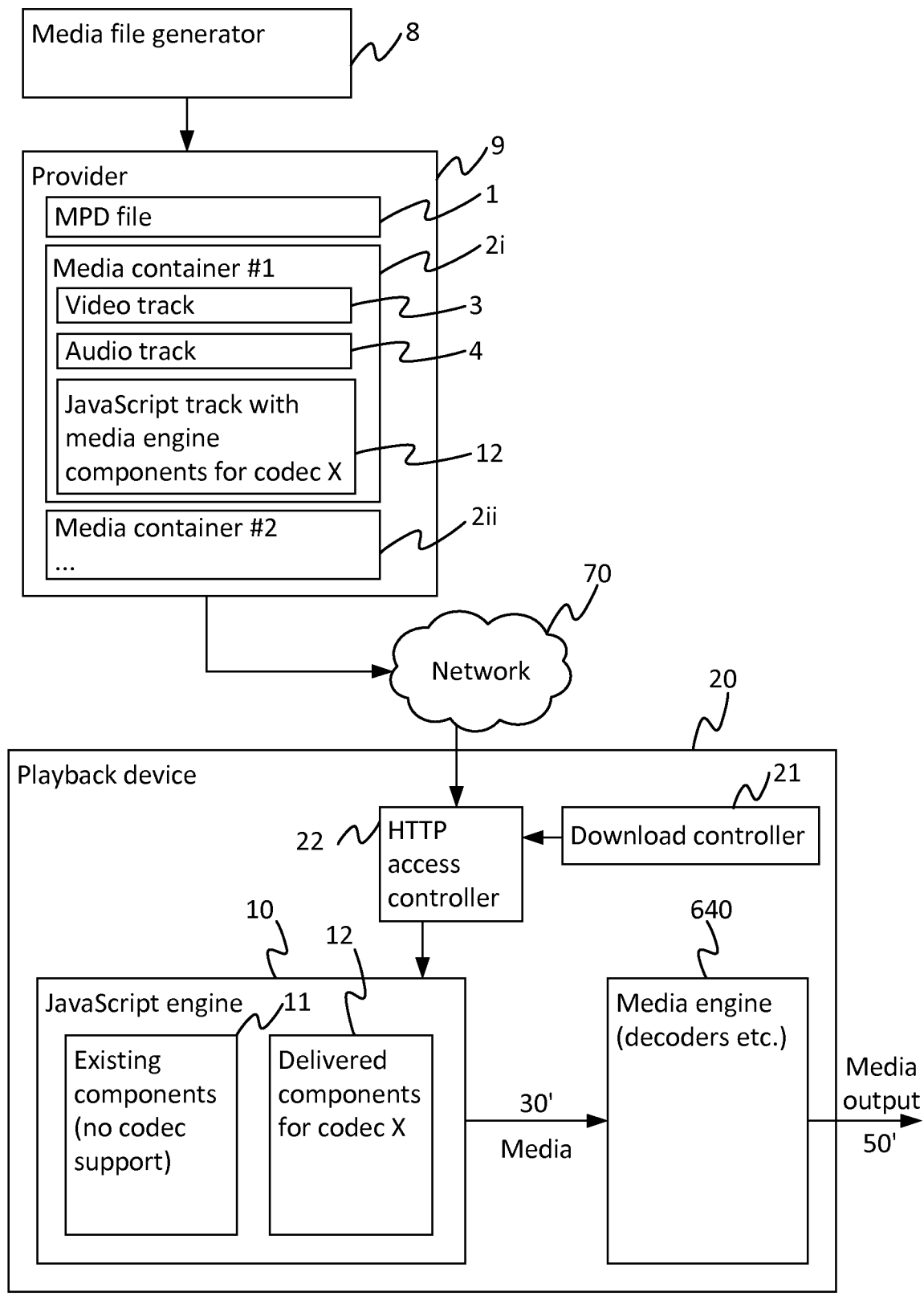
FIG. 6 is another schematic block diagram of a system for streaming media.

FIGS. 5 to 6 illustrate a variant of FIGS. 1F and 2. This is an example of streaming ISOBMFF containers using MPEG-DASH. In this example the received media data structure 99 comprises a media presentation description file 1 in the form of an MPEG-DASH (MPG) file. The received media data structure 99 further comprises a sequence of ISOBMFF containers 2, received in a streamed fashion based on the received MPD file. The providing apparatus 9 takes the form of a server, the transfer medium 70 takes the form of a network 70 such as the Internet, and the receive controller 21 takes the form of a streaming controller. Optionally the providing apparatus 9 may take the form of a web server, the access controller 22 may take the form of an HTTP access controller, and at least the script engine 10 may be the script engine of a web browser, e.g. a JavaScript engine. Optionally the providing apparatus 9 may take the form of a web server, the access controller 22 may take the form of an HTTP access controller, and at least the script engine 10 may be the script engine of a web browser, e.g. a JavaScript engine.

FIG. 5 also illustrates an example where the issue with the received media data structure 99 is that the media content 3 or 4 is encoded according an encoding format not supported by the media engine. In general however, note that the question of whether the media data structure 99 is downloaded as a whole or streamed is independent of the question of whether the issue is the support for the encoding format, container format or other formatting issue.

FIG. 5 shows the case where there is no embedded script 12 in any of the containers 2 of the streamed data structure 99 and the media engine 40 is not capable of processing the encoding format X (e.g. AC-4, MPEG-D USAC or MPEG-H) used in the first layer A of the received containers 2. The existing components 11 run on the script engine 10 either identify that the received data structure 99 uses an encoding format which the media engine 40 is not capable of decoding and terminates the process, or else they simply forward the received encoded media 5 straight to the media engine 40 in the encoded form which the media engine 40 cannot process. Either way, this results in no media output 50 from the media engine 40.

FIG. 6 illustrates a corresponding scenario but where a suitable transcoding or decoding script 12 is embedded in the media data structure 99 in accordance with embodiments disclosed herein. The script engine 10 is configured to identify that the media engine 40 is not capable of decoding the encoding format used in the received data structure 99, but also that the received media data structure 99 contains an embedded script 12 capable of transcoding the received encoding format to an encoding format that is recognized by the media engine 40 (e.g. to MP3), or decoding the encoded media 5. In response, the script engine 10 extracts and runs the script 12 in order to transcode or decode the encoded media content 5 of the received data structure 99 for input 30' to the media engine 40. The media engine 40 is then able to decode the transcoded encoding format for play out, or play out the decoded media as decoded by the script 12.

Figure 7:
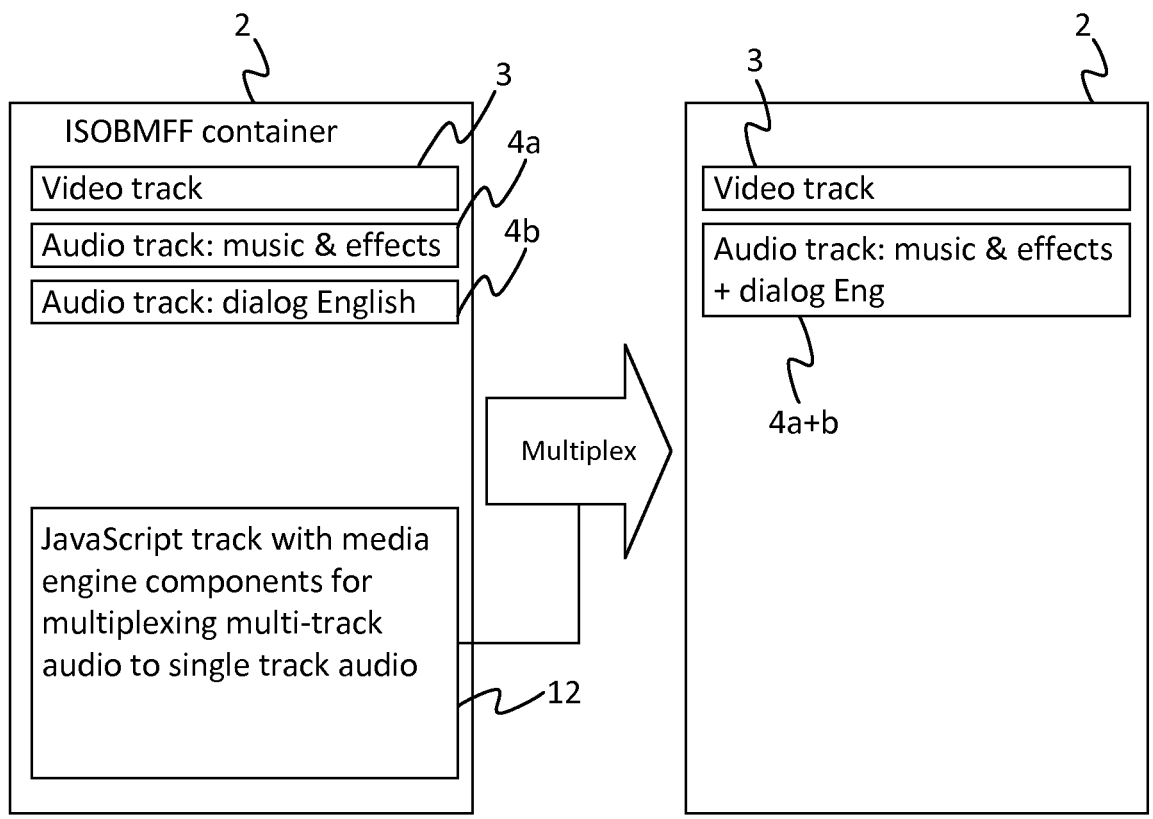
FIG. 7 is a schematic block diagram of a method of multiplexing streams.

FIG. 7 illustrates an example of multiplexing multiple streams. Here the (or each) container 2 comprises multiple audio streams 4a, 4b in the forms of tracks at the first layer, layer A. For example the multiple streams may take the form of different respective substreams in AC-4 or MPEG-H Audio. The delivered script 12 comprises a conversion algorithm configured to multiplex the multiple audio streams 4a, 4b into a single audio stream 4a+b. The multiplexed stream 4a+b is input to a single audio buffer of the media engine 40 for playout. This may be useful for example in the case of an existing web browser which has only a single audio buffer and which would otherwise only be able to play out one of the tracks, leading to an incomplete audio experience. In variants of the multi-stream scenario, the different streams may take the form of different assets at the second layer, layer B. In this case the script 12 multiplexes the streams from the different assets 13 into a single stream for playout via the single audio buffer of the media engine 40. Generally, the multiplexing could comprise merging elementary streams which can be either different tracks within one file or sequence of containers 2, or different streams at a higher layer.

Though not illustrated explicitly in FIG. 7, similar multiplexing techniques may alternatively or additionally be applied to multiple video streams, such as streams for layered or scalable video streams.

It will be appreciated that the above embodiments have been described by way of example only.

For instance, the described techniques are not limited to the context of a web browser. Any one, more or all of the elements 10, 21, 22, 40 may be implemented in another type of application other than a web browser, e.g. a dedicated media player application, or a VoIP application, etc.; or as another example, as elements of the operating system of the receiving apparatus 20; or even in dedicated hardware; or any combination of such implementations. Further, the embedded code 12 is not limited to being JavaScript. In other embodiments, the embedded code 12 may take the form of any script for running in any kind of virtual machine or sandboxed execution environment of the receiving apparatus 20, or more generally any other engine for interpreting or compiling runnable code (e.g. by means of just-in-time compilation). E.g. in one alternative, the runnable code 12 may comprise Webassembly code. Furthermore, the scope of the present disclosure is not limited to the particular example streaming formats, container formats and encoding formats disclosed herein. For example, for audio, the media encoding scheme found in the receive data structure 99 may comprise any of AC-3, EAC-3, AC-4, MPEG-4 AAC, MPEG-D, MPEG-H Audio, or others; and the embedded component 12 may transcode to any of the AAC family of codecs, mp3, Opus, or others. Similarly, various video encoding formats, media container formats and streaming formats will be known to a person skilled in the art. More generally, similar techniques may be applied for converting or accessing any kind of data structure format not processable by the media engine 40 directly.

Other variants or applications may become apparent to a person skilled in the art once given the disclosure herein. The scope of the present disclosure is not limited by the present disclosure but only by the accompanying claims.

Various aspects of the present invention may be appreciated from the following enumerated example embodiments (EEEs):

1. A method of playing out media from a media engine run on a receiving apparatus, the method comprising:
   at the receiving apparatus, receiving a media data structure comprising audio or video content formatted in a plurality of layers, including at least a first layer comprising the audio or video content encoded according to an audio or video encoding scheme respectively, and a second layer encapsulating the encoded content in one or more media containers according to a media container format;
   determining that at least one of said media containers further encapsulates runnable code for processing at least some of the formatting of the media data structure in order to support playout of the audio or video content by the media engine;
   running the code on a code engine of the receiving apparatus in order to perform said processing of the media data structure for input to the media engine; and
   inputting a processed version of the data structure to the media engine following the processing by at least said code in order to play out the media content.

2. The method of EEE 1, wherein one or both of the code engine and media engine are incorporated in a web browser run on the receiving apparatus, or a plug-in to the web browser.

3. The method of EEE 1 or 2, wherein said content is audio content and said encoding scheme is an audio encoding scheme.

4. The method of any preceding EEE, wherein the media encoding scheme used in the received data structure is an ETSI standard or an MPEG standard.

5. The method of EEE 3 and 4, wherein the media encoding scheme used in the received data structure comprises one of: AC-4, AC-3, EAC-3, MPEG-4 AAC, MPEG-D USAC, or MPEG-H Audio.

6. The method of any preceding EEE, wherein the container format is an ISO Base Media File Format.

7. The method of any preceding EEE, wherein the code takes the form of JavaScript.

8. The method of any preceding EEE, wherein said processing comprises processing at least part of the formatting of the first layer.

9. The method of any preceding EEE, wherein said processing comprises processing at least part of the formatting of the second layer.

10. The method of EEE 8, wherein the media engine comprises no decoder capable of decoding the encoding scheme used in the received media resource; and wherein said processing comprises either: decoding the content for playout by the media engine, or transcoding the media content to a second encoding scheme which the media engine is capable of decoding.

11. The method of EEE 8 or 10, wherein the media data structure comprises multiple audio streams or multiple video streams, and wherein said processing comprises multiplexing the multiple audio streams into a same audio stream for playout via a same audio buffer of the media engine, or multiplexing the multiple video streams into a same video stream for playout via a same video buffer of the media engine.

12. The method of EEE 3 and 10, wherein the second encoding scheme comprises one of: an AAC standard, MP3, Opus, or a PCM scheme.

13. The method of EEE 9, wherein the media engine is not capable of accessing the container format used in the received resource, and wherein said processing comprises converting to a second container format which the media engine is capable of accessing.

14. The method of EEE 13, wherein the second container format is MPEG-2 TS.

15. A computer program comprising software embodied on computer-readable storage and configured so as when run on one or more processors of the receiving apparatus to perform the method of any of EEEs 1 to 14.

16. The receiving apparatus for performing the method of any of EEEs 1 to 14, the receiving apparatus comprising:
an interface for the receipt of the media data structure;
a controller configured to perform said determination;
the code engine, being arranged to perform said running of the code; and
the media engine, being arranged to perform said playout of the media content following said processing.

17. A method of supplying media, the method comprising:
outputting a media data structure for receipt by a receiving apparatus, the media data structure comprising audio or video content formatted in a plurality of layers, including at least a first layer encoding the audio or video content according to an audio or video encoding scheme respectively, and a second layer encapsulating the encoded content in one or more media containers according to a media container format;
wherein at least one of the media containers further encapsulates runnable code for processing at least some of the formatting of the media data structure in order to support playout of the audio or video content by a media engine of the receiving apparatus.

18. Apparatus for generating a media data structure, the apparatus comprising one or more processors and storage storing code arranged to run on at least one of the one or more processors; the code being configured so as when thus run to perform operations of:
generating a media data structure comprising audio or video content formatted in a plurality of layers, including at least a first layer encoding the audio or video content according to an audio or video encoding scheme respectively, and a second layer encapsulating the encoded content in one or more media containers according to a media container format; and
further encapsulating, in at least one of the media containers, runnable code for processing at least part of the formatting of the media data structure in order to support playout of the audio or video content by a media engine.

19. A media data structure embodied on computer-readable storage, the media data structure comprising:
audio or video content formatted in a plurality of layers, including at least a first layer encoding the audio or video content according to an audio or video encoding scheme respectively, and a second layer encapsulating the encoded content in one or more media containers according to a media container format; and
encapsulated in at least one of the media containers, runnable code for processing at least part of the formatting of the media data structure in order to support playout of the audio or video content by a media engine.

The invention claimed is:

1. A method of playing out media from a media engine run on a receiving apparatus, the method comprising:
at the receiving apparatus, receiving a media data structure comprising media content formatted in a plurality of layers, including at least a first layer comprising the media content encoded according to a media encoding scheme, and a second layer encapsulating the encoded media content in one or more media containers according to a media container format;
identifying that the media engine is not capable of accessing the media container format of the second layer of the media data structure,
determining that at least one of said media containers further encapsulates runnable code for processing at least some of the formatting of the media data structure, wherein said processing comprises processing at least part of the formatting of the second layer in order to convert the media data structure into a second media container format which the media engine is capable of accessing, thereby supporting playout of the media content by the media engine;
running the runnable code on a code engine of the receiving apparatus in order to perform said processing at least some of the formatting of the media data structure for input to the media engine; and
inputting a processed version of the media data structure to the media engine in order to play out the media content.

2. The method of claim 1, wherein said processing at least some of the formatting of the media data structure further comprises processing at least part of the formatting of the first layer.

3. The method of claim 2, wherein the media engine comprises no decoder capable of decoding the media encoding scheme used in the media data structure; and wherein said processing at least part of the formatting of the first layer comprises either: decoding the media content for playout by the media engine, or transcoding the media content to a second media encoding scheme which the media engine is capable of decoding.

4. The method of claim 2, wherein the media data structure comprises multiple audio streams or multiple video streams, and wherein said processing comprises multiplexing at least two of the multiple audio streams into a same audio stream for playout via a same audio buffer of the media engine, or multiplexing at least two of the multiple video streams into a same video stream for playout via a same video buffer of the media engine.

5. The method of claim 1, wherein one or both of the code engine and media engine are incorporated in a web browser run on the receiving apparatus, or a plug-in to the web browser.

6. The method of claim 1, wherein said media content is audio content and said media encoding scheme is an audio encoding scheme.

7. The method of claim 1, wherein the media encoding scheme used in the media data structure is an ETSI standard or an MPEG standard.

8. The method of claim 6, wherein the media encoding scheme used in the media data structure comprises one of: AC-4, AC-3, EAC-3, MPEG-4 AAC, MPEG-D USAC, or MPEG-H Audio.

9. The method of claim 1, wherein the media container format is an ISO Base Media File Format.

10. The method of claim 1, wherein the runnable code takes the form of JavaScript.

11. The method of claim 3, wherein said media content is audio content and said media encoding scheme is an audio encoding scheme, and wherein the second media encoding scheme comprises one of: an AAC standard, MP3, Opus, or a PCM scheme.

12. The method of claim 1, wherein the second media container format is MPEG-2 TS.

\* \* \* \* \*